United States Patent [19]

Müller

[11] Patent Number: 4,919,470
[45] Date of Patent: Apr. 24, 1990

[54] MOTOR VEHICLE DOOR PANEL

[75] Inventor: Olaf Müller, Rüsselheim, Fed. Rep. of Germany

[73] Assignee: R. Schmidt GmbH, Lennestadt, Fed. Rep. of Germany

[21] Appl. No.: 278,653

[22] Filed: Dec. 1, 1988

[30] Foreign Application Priority Data

Dec. 3, 1987 [DE] Fed. Rep. of Germany ....... 3740938

[51] Int. Cl.$^5$ ................................................ B60J 9/00
[52] U.S. Cl. ..................................... 296/153; 296/901
[58] Field of Search ................................. 296/153, 901

[56] References Cited

U.S. PATENT DOCUMENTS

| | | | |
|---|---|---|---|
| 3,387,881 | 6/1968 | Steponek et al. | 296/153 |
| 3,400,979 | 9/1968 | James | 296/153 |
| 3,620,566 | 11/1971 | LeConte | 296/153 |
| 4,226,464 | 10/1980 | Janz et al. | 296/153 |
| 4,456,644 | 6/1984 | Jantz et al. | 276/153 |

Primary Examiner—Robert R. Song
Attorney, Agent, or Firm—Herbert Dubno

[57] ABSTRACT

To make a door panel for a motor vehicle from a shaped plate-like fiber fleece with an armrest and a cover made of a soft material with an economical fiber fleece material and to make assembly from its components easy, the armrest is made as a separate plastic injection-molded piece which has a flange positioned substantially parallel to its corresponding attachment region on the door panel. This flange is heat sealed with the door panel. A plurality of recesses may be provided in the armrest in a transition region between the flange of the armrest and the resting surface of the armrest and a corresponding plurality of projections engagable and lockable in the recesses are provided in the cover surface facing the armrest.

11 Claims, 3 Drawing Sheets

MOTOR VEHICLE DOOR PANEL

FIELD OF THE INVENTION

My present invention relates to a motor vehicle door panel and, more particularly, to an interior panel for an automobile door.

Background of the Invention

A conventional motor vehicle door panel is made from a shaped fiber fleece. The armrest can be formed in one piece with the door panel and can be provided with a foam piece which is glued to it. Any required shaping of the base member of the door panel together with the armrest calls for tough specifications for the fiber fleece material. A gluing on of the foam piece is very time consuming.

OBJECT OF THE INVENTION

It is an object of my invention to provide an improved door panel for a motor vehicle which can be made with economical fiber fleece and whose individual parts can be easily assembled.

SUMMARY OF THE INVENTION

These objects and others which will become more readily apparent hereinafter are attained in accordance with my invention in a door panel for a motor vehicle made from a shaped plate-like fiber fleece with an armrest and a cover made of soft material when called for.

According to my invention, the armrest is a separate thermoplastic injection-molded part which has a flange which can be positioned substantially parallel to an appropriate place of attachment on the door panel and the flange is heat sealed or fused with the door panel.

Advantageously, the armrest has a plurality of recesses in a transition region of the flange to the resting surface of the armrest and the cover made of soft material has a plurality of projections lockable in the recesses on the cover surface facing the armrest.

Because of the structure of the armrest as a separate plastic injection-molded part, it is possible to use a simple and economical fiber fleece for the door panel. The fiber fleece material can be made of bonded wood fibers. The door panel is substantially planar with a slight offset region, beveling or similar structure which is possible without further effort by the suitable price conscious material selection. The armrest itself is extruded from thermoplastic material which is very easy to work. The attachment of the armrest and the door panel occurs by a heat sealing or fusing process in which the cover made of soft material can be buttoned or inserted into suitable recesses in the armrest.

Advantageously, the armrest can be a half shell with a circumferential flange projecting outward.

In this way, a comparatively large surface is available for heat sealing which may further mediate the required loads during use.

It is advantageous when the door panel has at least in the vicinity of the armrest an offset portion and the fitting contacting surface of the armrest is supported in this offset portion by a corresponding similar offset region.

Thus the offset region should extend as much as possible in the longitudinal direction of the armrest so that when an arm of the user is placed on the armrest an additional support occurs on the offset region and thus a lasting seating of the armrest is further guaranteed.

Advantageously, the flange is friction welded with the door panel.

Furthermore, the door panel together with the armrest and the cover made of soft material can be provided with a decorative material with a design or markings.

The cover made of soft material may be made from a plastic soft foam, especially polyurethane soft foam. The cover is shaped like a shell to fit the corresponding shape of the armrest and has a flange formed covering the flange of the armrest.

In an advantageous embodiment of my invention, the resting surface of the armrest has a plurality of adjacent slots.

The slotted surface provides a springiness or resiliency to the plastic material so that a quasi-soft bearing surface is produced.

Advantageously, a soft foam covering piece or cover is provided over the slots in a combined slot and depression.

For example, for smoothing the compressible cross members on the armrest bearing surface a fitting piece of covering foil made from the usual waste or scrap can be deposited on them so that its edges can not be drawn apart.

A soft foam side of a covering foil can be placed so it faces upward and a hard upper layer can lie on the cross members so that untimely wear is prevented.

Advantageously, a plurality of slots is also provided on the lateral surfaces of the shell-shaped armrest. An improvement of the lateral crashworthiness of the door is attained by these slots.

The slots provided in the base member used in my invention can advantageously be provided in all other panel components or parts.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

The door panel 1 is made from a fiber fleece, especially from connected wood fibers. The door panel 1 has only a slightly deformed region, especially an offset portion 11, having a comparatively interiorly depressed surface and an outer protruding circumferential edge portion.

Figure 1:
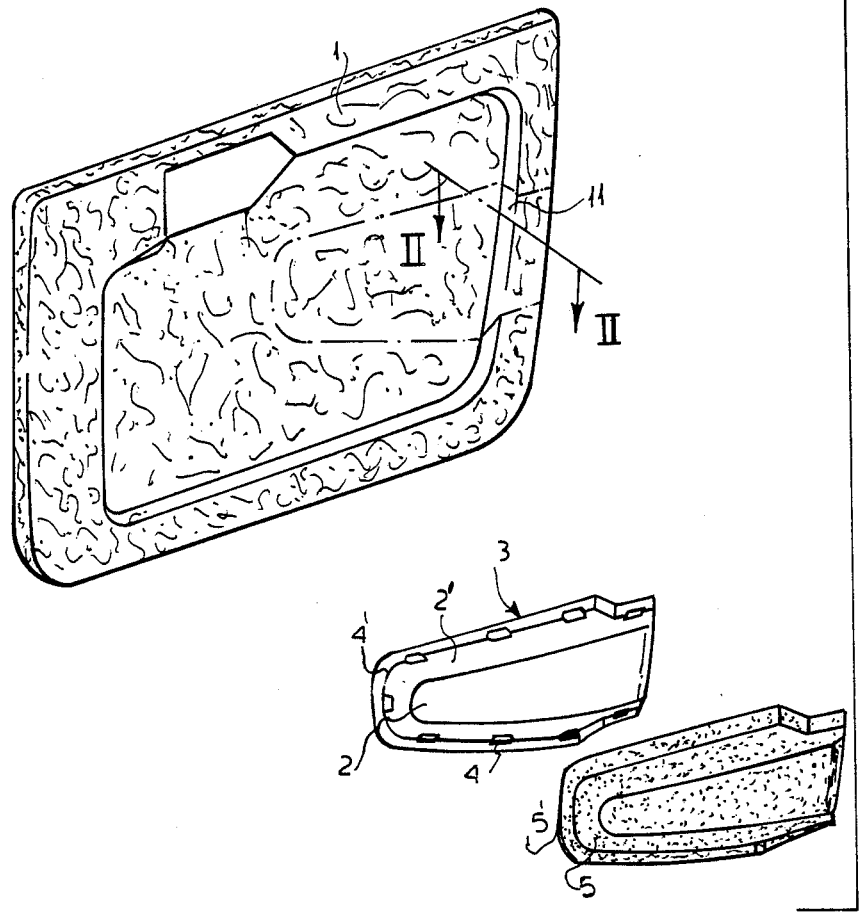
FIG. 1 is an exploded perspective view of the individual components of an embodiment of a motor vehicle door panel according to my invention.
Figure 2:
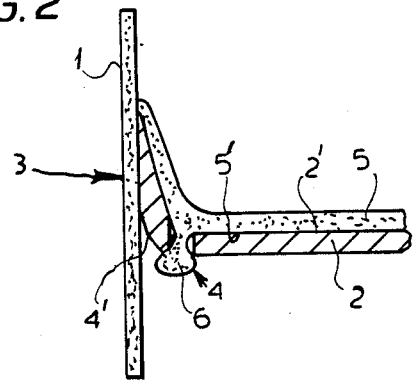
FIG. 2 is a cross-sectional view of the components of the motor vehicle door panel taken along the section line II—II in FIG. 1.

The armrest 2 is a thermoplastic injection-molded part shaped like a half shell which as an outer circumferential flange 3. A plurality of recesses 4 are provided in a transition region 4' between the resting surface 2 of the armrest 2 and the flange 3. A cover 5 made of soft material is formed from polyurethane soft foam whose shape is fit to the shape of the armrest 2 together with the flange 3 so that in the assembled configuration the armrest 2 is completely covered by the cover 5 as is apparent from FIG. 2.

A plurality of projections 6 are formed on the cover surface 5' of the cover 5 facing the armrest 2. These projections 6 are inserted in the corresponding recesses 4 in the armrest 2 and act as anchors. This is particularly clearly seen in FIG. 2.

The manufacture of the parts 1, 2 and 5 occurs individually. After that the cover 5 made of soft foam is fastened on the armrest 2 and subsequently the armrest 2 is fused or heat sealed to the door panel 1 formed like a wood fiber plate with a friction heat seal. The individual parts are thus simple to make and are very easily combined into a finished unit.

Subsequently, the complete cover 2 may be provided with a decorative material and/or foil with a design.

To transmit the forces on the armrest 2 when it is under load even better, the offset portion 11 and an appropriate offset region of the armrest 2 are provided so that the armrest 2 can fit into the door panel 1 and be supported. Without that the assembled unit can be broken more easily.

Figure 3:
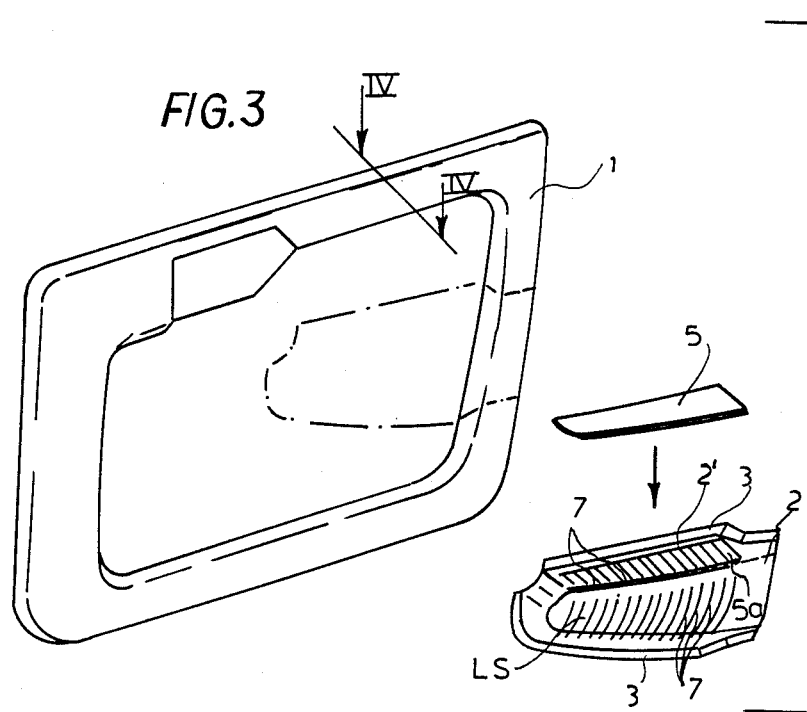
FIG. 3 is an exploded perspective view of the individual components of another embodiment of a motor vehicle door panel according to my invention.
Figure 4:
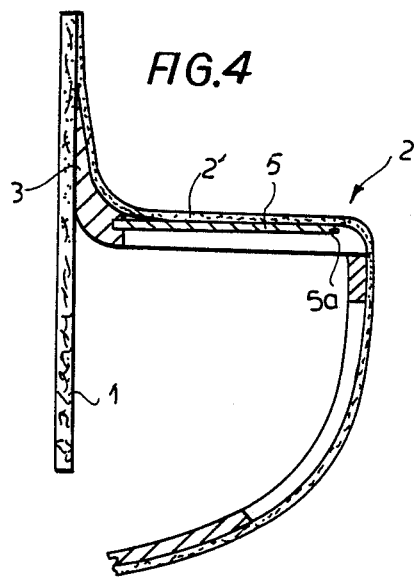
FIG. 4 is a cross-sectional view of the components of the motor vehicle door panel taken along the section line IV—IV in FIG. 3.
Figure 5:
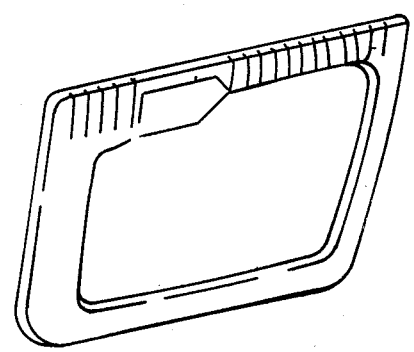
FIGS. 5, 6 7 and 8 are perspective views showing other forms of my invention.
Figure 6:
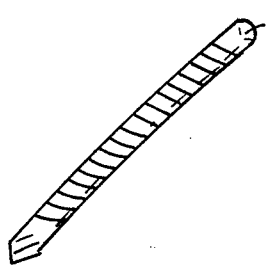
Figure 7:
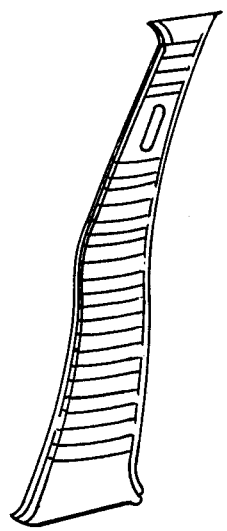
Figure 8:
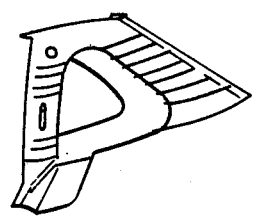

Another embodiment is shown in the drawing FIGS. 3 and 4. The resting surface 2' of the armrest 2 is provided with a plurality of adjacent slots 7 directed parallel to each other which thus form cross members making by their compressibility or deformability, according to the covering, the feel of a soft cover.

Since, however, the cross members arising by the slotting process can be pushed apart slightly on pressing in, a piece of waste covering foil or scrap comprising the soft foam cover 5 in this embodiment is placed over them. The soft foam cover 5 is deposited as a loose cutout piece in a combined slot and depression 5a in the armrest 2 as is indicated in FIGS. 3 and 4. Furthermore, the armrest 2 is also slotted on its lateral surface LS so that on experiencing a lateral impact the armrest 2 can fold together or collapse under the desired small applied force.

Also in the embodiment of FIGS. 3 and 4, the assembled unit as is apparent from FIG. 4 is subsequently covered with foil or material.

In the embodiments shown in FIGS. 5 to 8, panels or covers from a door and lateral struts (front, center, rear) are provided with a plurality of adjacent slots as in the embodiment above to allow a springiness or compression and a desirable degree of collapsability on application of a lateral force or impact.

My invention is not limited to the particular embodiments recited above but may be varied in many ways within the scope of my disclosure.

All new individual features and their combinations which are disclosed in the description and/or drawing should be considered part of my invention.

I claim:

1. In a door panel for a motor vehicle made from a shaped plate-like fiber fleece with an armrest and a cover made of a soft material when called for, the improvement wherein said armrest is a separate thermoplastic injection-molded part which has a flange which is positioned substantially parallel to an appropriate place of attachment on said door panel and said flange is heat sealed or fused with said door panel, said armrest having a plurality of recesses in a transition region of said flange to the resting surface of said arm rest, said cover made of soft material having a plurality of projections engageable and lockable in said recesses on a cover surface facing said armrest.

2. In a door panel for a motor vehicle made from a shaped plate-like fiber fleece with an armrest and a cover made of a soft material when called for, the improvement wherein said armrest is a separate thermoplastic injection-molded part which has a flange which is positioned substantially parallel to an appropriate place of attachment on said door panel and said flange is heat sealed or fused with said door panel, said armrest being shaped like a half shell with said flange being circumferential and projecting outward.

3. The improvement according to claim 2 wherein said door panel has an offset portion at least in the vicinity of said armrest and the shaped contacting surface of said armrest fitting with said offset portion is supported therein with a similar other offset region.

4. The improvement according to claim 2 wherein said flange is friction welded to said door panel.

5. The improvement according to claim 2 wherein said door panel together with said armrest and said soft material is covered with a decorative material having markings or a design.

6. The improvement according to claim 2 wherein said cover is made of a polyurethane soft foam material shaped according to the shape of said armrest and has a shaped flange covering said flange of said armrest.

7. The improvement according to claim 2 wherein the resting surface of said armrest has a plurality of adjacent slots.

8. The improvement according to claim 7 wherein a soft foam cover is positioned over said slots.

9. The improvement according to claim 2 wherein said armrest is provided with a lateral surface which is slotted.

10. A motor vehicle door panel comprising:
   a shaped plate-like fiber fleece;
   an armrest which is a separately thermoplastic injection-molded part having a circumferential outwardly directed flange positioned substantially parallel to an appropriate place of attachment on said door panel heat sealed or fused with said door panel, said armrest having a plurality of recesses in a transition region of said flange to the resting surface of said armrest; and
   a cover made of a soft material having a plurality of projections engagable and lockable in said recesses on a cover surface facing said armrest.

11. A motor vehicle door panel comprising:
   a shaped plate-like fiber fleece;
   a half shell-shaped armrest which is a separately thermoplastic injection-molded part having a circumferential outwardly directed flange positioned substantially parallel to an appropriate place of attachment on said door panel heat sealed or fused with said door panel, the resting surface and/or the lateral surface of said armrest having a plurality of adjacent slots; and
   a cover made of polyurethane soft foam shaped according to the shape of said armrest and having a shaped flange covering said flange of said armrest and said slots.

* * * * *